United States Patent
Le Gall

(10) Patent No.: US 11,713,138 B2
(45) Date of Patent: Aug. 1, 2023

(54) TOOLING FOR PLACING A PROPULSIVE ASSEMBLY FROM A HORIZONTAL POSITION TO A VERTICAL POSITION

(71) Applicant: SAFRAN AIRCRAFT ENGINES, Paris (FR)

(72) Inventor: Remy Le Gall, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/416,759

(22) PCT Filed: Dec. 16, 2019

(86) PCT No.: PCT/FR2019/053076
§ 371 (c)(1),
(2) Date: Jun. 21, 2021

(87) PCT Pub. No.: WO2020/128267
PCT Pub. Date: Jun. 25, 2020

(65) Prior Publication Data
US 2022/0073215 A1 Mar. 10, 2022

(30) Foreign Application Priority Data
Dec. 21, 2018 (FR) ...................................... 1873728

(51) Int. Cl.
*B64F 5/50* (2017.01)
*F01D 25/28* (2006.01)

(52) U.S. Cl.
CPC .............. *B64F 5/50* (2017.01); *F01D 25/285* (2013.01); *F05D 2230/72* (2013.01)

(58) Field of Classification Search
CPC ...... B64F 5/50; F01D 25/285; F05D 2230/72; F05D 2230/60; F05D 2230/70; Y02T 50/60
See application file for complete search history.

(56) References Cited

U.S. PATENT DOCUMENTS

| | | | | |
|---|---|---|---|---|
| 5,383,652 | A | * 1/1995 | Van Den Berg | ........ B66C 1/107 269/51 |
| 2016/0121409 | A1 | * 5/2016 | Withey | ..................... F02C 7/04 409/137 |
| 2020/0347752 | A1 | * 11/2020 | Porco | ................... B25H 1/0007 |

FOREIGN PATENT DOCUMENTS

| | | |
|---|---|---|
| EP | 2 896 797 A1 | 7/2015 |
| FR | 2 389 768 A1 | 12/1978 |

(Continued)

OTHER PUBLICATIONS

International Search Report dated Mar. 13, 2020, issued in corresponding International Application No. PCT/FR2019/053076, filed Dec. 16, 2019, 7 pages.

(Continued)

*Primary Examiner* — Lawrence Averick
(74) *Attorney, Agent, or Firm* — Christensen O'Connor Johnson Kindness PLLC

(57) ABSTRACT

Tooling for placing a propulsive assembly from a horizontal position to a vertical position includes a front tool and a rear tool. The front tool has a first assembly with a frame configured to be positioned and maintained with respect to a front casing. The frame has a first connection interface configured to be connected to a first lifting system such that the frame is movable about an axis of rotation (R). The front tool also has a second assembly with a shaft configured to be positioned and maintained with respect to a rotor and a member for connection between the first assembly and the second assembly. The tooling further includes a rear tool configured to be positioned and maintained with respect to the rear casing. The rear tool has a second connection interface configured to be connected to a second lifting system.

11 Claims, 12 Drawing Sheets

(56) References Cited

FOREIGN PATENT DOCUMENTS

FR   2 990 190 A1   11/2013
JP   3716070 B2   11/2005
WO   2011/061307 A1   5/2011

OTHER PUBLICATIONS

Written Opinion of the International Searching Authority dated Mar. 13, 2020, issued in corresponding International Application No. PCT/FR2019/053076, filed Dec. 16, 2019, 7 pages.
Written Opinion dated Mar. 13, 2020, issued in corresponding International Application No. PCT/FR2019/053076, filed Dec. 16, 2019, 5 pages.
International Preliminary Report on Patentability dated Jun. 16, 2021, issued in corresponding International Application No. PCT/FR2019/053076, filed Dec. 16, 2019, 8 pages.

\* cited by examiner

TOOLING FOR PLACING A PROPULSIVE ASSEMBLY FROM A HORIZONTAL POSITION TO A VERTICAL POSITION

TECHNICAL FIELD OF THE DISCLOSURE

Embodiments of the present disclosure relate to an installation for placing a propulsive assembly from a horizontal position to a vertical position, and more particularly to a tooling of the installation for placing a propulsive assembly from a horizontal position to a vertical position.

TECHNICAL BACKGROUND

A propulsive assembly with an axis X comprises, for example, a dual flow turbomachine comprising, from front to rear, following the direction of air flow through the turbomachine, a fan module and a gas generator typically comprising one or more compressor stages, low pressure and high pressure, a combustion chamber, one or more turbine stages, high pressure and then low pressure.

A fan module traditionally comprises a rotor carrying blades and a front casing surrounding the blades. The front casing is more commonly referred to as the "fan casing". The front casing is flanged to an outer shell of an intermediate casing.

To remove one or more modules from a propulsive assembly, for example during maintenance operation, it is necessary to move the propulsive assembly to a vertical position (vertical axis X).

When a propulsive assembly is detached from an aircraft, it is traditionally stored in a storage device in a horizontal position (horizontal axis X).

Thus, to remove one or more modules from a propulsive assembly, the propulsive assembly must be moved from a horizontal to a vertical position.

To move a propulsive assembly from a horizontal to a vertical position, it is known to use a front tool connected to a lifting system and added on to the outer shell of the intermediate casing.

Such a mounting is only compatible with an intermediate casing that has sufficient mechanical properties to take up the forces when the propulsive assembly is placed in a vertical position.

The engine manufacturers are developing intermediate casings with an optimised structure in order to increase the overall performance of the propulsive assembly. Such intermediate casings are for example made of composite materials and/or have a reduced number of structural arms. Such intermediate casings have insufficient mechanical properties to take up the forces when the propulsive assembly is placed in a vertical position.

The present disclosure therefore aims to propose a tooling allowing to place a propulsive assembly from a horizontal position to a vertical position regardless of the mechanical properties of the intermediate casing.

SUMMARY

To this end, embodiments of the disclosure propose a tooling for placing a propulsive assembly from a horizontal position to a vertical position, the propulsive assembly being defined by a first axis X and comprising at least one fan module at a front end of the propulsive assembly and a rear casing at a rear end opposite to the front end, the fan module comprising a rotor carrying blades and a front casing surrounding the blades, the tooling comprising:

a front tool defined by a second axis A and comprising:
  a first assembly comprising a frame configured to be positioned and held with respect to the front casing of the fan module, the frame comprising a first connection interface configured to be connected with a first attaching means of a first lifting system so that the frame is movable about an axis of rotation R with respect to the first attaching means;
  a second assembly comprising a shaft configured to be positioned and held with respect to the rotor of the fan module;
  a member for connection between the first assembly and the second assembly, the connection member being configured to be, on the one hand, positioned and held with respect to the first assembly, and on the other hand, positioned and held with respect to the second assembly;
a rear tool defined by a third axis B and configured to be positioned and held with respect to the rear casing, the rear tool comprising a second connection interface configured to be connected to second attaching means of a second lifting system.

Such a tooling allows the propulsive assembly to take up forces in an optimal manner, and in particular the forces generated by the weight of the propulsive assembly. In fact, the forces are taken up at the front by the stiffened fan module (via the front tool) and at the rear by the rear casing. The front tool stiffens the fan module by immobilising the rotor with respect to the front casing. Thus, at the front, the forces are taken up by the stiffened fan module, and in particular by the front casing and by the rotor. This distribution of forces minimises deformation when the propulsive assembly is placed in the vertical position, and thus prevents damage.

The tooling according to the disclosure may comprise one or more of the following features, taken in isolation from each other or in combination with each other:

the first assembly comprises two trunnions opposite and aligned according to the axis of rotation R, the two trunnions defining the first connection interface, each trunnion being configured to be connected to the first attaching means of the first lifting system;

the shaft is configured to be housed at least in part in an internal housing of the rotor, the second assembly comprising:
  a first front centering surface of the shaft configured to be inserted in a first front bore of the housing;
  a second rear centering surface of the shaft configured to be inserted in a second rear bore of the housing;
  a first front bearing surface of the shaft configured to come into axial bearing with a first rear face of an abutment of the housing;
  a second rear bearing surface of a ring added on to the shaft, the second bearing surface being configured to come into axial bearing with a second front face of the rotor;
  a first nut added on to the shaft, the first nut comprising a tapped portion cooperating with a first threaded portion of the shaft so that tightening of the first nut holds contact not only between the first bearing surface and the first face but also between the second bearing surface and the second face;

the first bearing surface is defined by at least two coplanar facets, the facets being perpendicular to the second axis A and circumferentially spaced, each of the facets being formed on a tooth projecting radially from the shaft, the teeth being adapted to pass axially through the abutment via complementarily shaped apertures made in the abutment the circumferential space between the at least two facets defines an axial passage, the ring comprising an axially projecting lug configured to pass simultaneously through one of the apertures and the passage so as to rotatably connect the shaft with the rotor and ensure contact between the first bearing surface and the first face;

the first front centering surface is configured to be inserted in the first front bore made in the abutment;

the first assembly comprises:
  a third blind bore of the frame configured to receive a third centering surface of a collar of the front casing;
  a third rear bearing surface of the frame configured to come into axial bearing with a third front face of the collar of the front casing;
  at least a first holding element configured to reversibly hold the collar to the frame when the third bore receives the third centering surface and the third bearing surface bears against the third face;

the connection member comprises:
  a fourth centering surface inserted in a fourth bore of the frame;
  a fourth rear bearing surface axially bearing against a fourth front face of the frame;
  at least one second holding element configured to reversibly hold the connection member to the frame when the fourth centering surface is inserted in the fourth bore and the fourth bearing surface bears against the fourth face;

the second assembly comprises a fifth centering surface of the shaft placed in front of the first nut, the fifth centering surface being inserted in a fifth bore of the connection member, the second assembly comprising a second nut added on to the shaft, the second nut comprising a tapped portion cooperating with a second threaded portion of the shaft so that tightening of the second nut holds the second assembly relative to the first assembly;

the second assembly comprises a locknut placed between the first nut and the connection member, the locknut comprising a tapped portion cooperating with the first threaded portion of the shaft.

A second object of the disclosure is an installation for placing a propulsive assembly defined by a first axis X from a horizontal position to a vertical position, the installation comprising:

a tooling as previously described;

a first lifting system comprising first means for attaching to the first assembly, the first lifting system being configured to horizontally move the first attaching means along a longitudinal axis L and vertically move the first attaching means, the longitudinal axis L being parallel to the first axis X of the propulsive assembly when in a horizontal position;

a second lifting system comprising second means for attaching to the rear tool, the second lifting system being configured to horizontally move the second attaching means along the longitudinal axis L and vertically move the second attaching means.

A third object of the disclosure is a method of mounting the tooling of an installation as previously described on a propulsive assembly defined by a first axis X and comprising at least one fan module at a front end of the propulsive assembly and a rear casing at a rear end opposite the front end, the fan module comprising a rotor carrying blades and a front casing surrounding the blades, the mounting method comprising the following steps:

a step of mounting the front tool on the fan module so that the axis of rotation R is substantially horizontal;

a step of mounting the rear tool on the rear casing.

The step of mounting the front tool may comprise the following sub-steps:

a sub-step of connecting the first attaching means of the first lifting system to the first connection interface of the frame;

a sub-step of positioning and holding the frame in position with respect to the front casing of the fan module;

a sub-step of positioning and holding the shaft in position with respect to the rotor of the fan module;

a sub-step of positioning the connection member with respect to the first and second assemblies;

a sub-step of holding the connection member in position with respect to the first assembly;

a sub-step of holding the connection member in position with respect to the second assembly.

The step of mounting the rear tool may comprise the following sub-steps:

a sub-step of connecting the second attaching means of the second lifting system to the second connection interface of the rear tool;

a sub-step of positioning and holding the rear tool in position with respect to the rear casing.

It is a fourth object of the disclosure to provide a method of placing a propulsive assembly from a horizontal position to a vertical position by means of an installation as previously described, the tooling of the installation being mounted on the propulsive assembly as previously described, the propulsive assembly being disposed in a storage device in a horizontal position, the first and second attaching means being respectively connected to the first and second connection interfaces, the placing method comprising the following steps:

a step of removing the propulsive assembly so that the propulsive assembly is only supported by the front and rear tools;

a step of maneuvering the first and second lifting systems so as to tilt the propulsive assembly about the axis of rotation R so as to lower the front tool and raise the rear tool;

a step of placing the propulsive assembly in a vertical position on ground bearing means of the front tool so that the first axis X of the propulsive assembly is vertical.

DESCRIPTION OF THE DRAWINGS

The disclosure will be better understood and other details, characteristics and advantages of the disclosure will become clearer upon reading the following description made by way of non-limiting example and with reference to the attached drawings in which.

DETAILED DESCRIPTION

Figure 1:
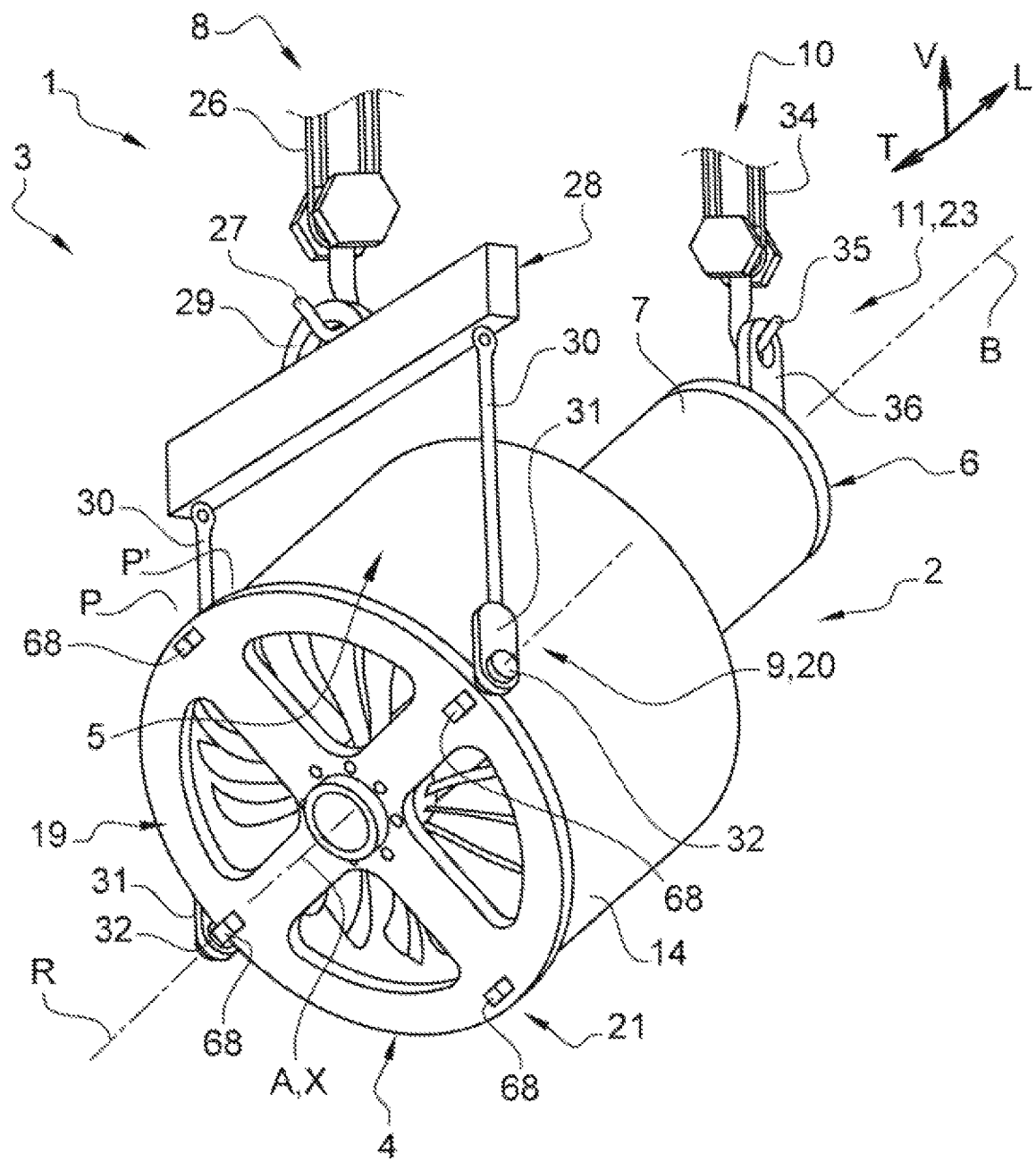
FIG. 1 is a perspective view of an installation according to the disclosure.
Figure 2:
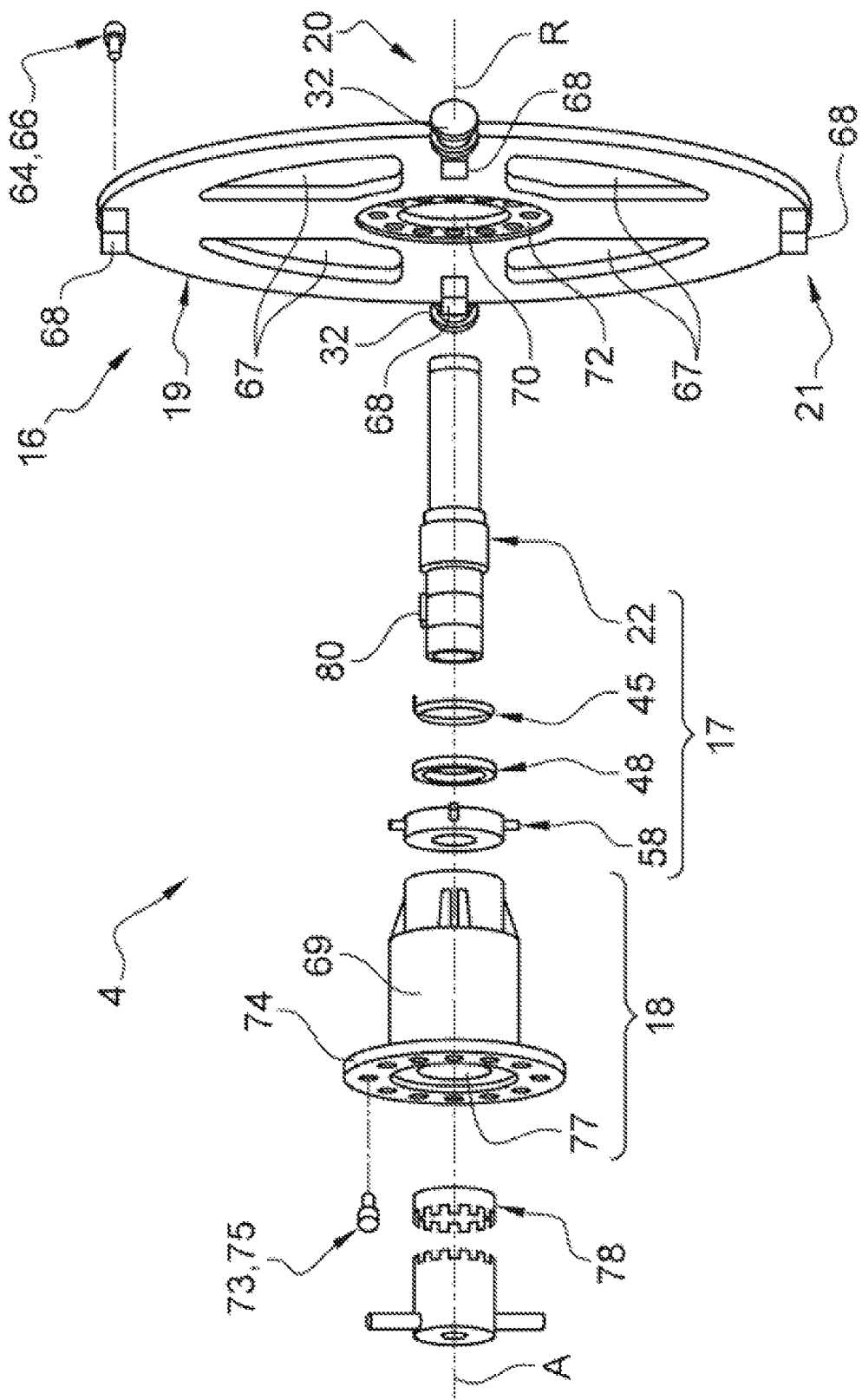
FIG. 2 is an exploded perspective view of a front tool of a tooling of the installation.
Figure 10:
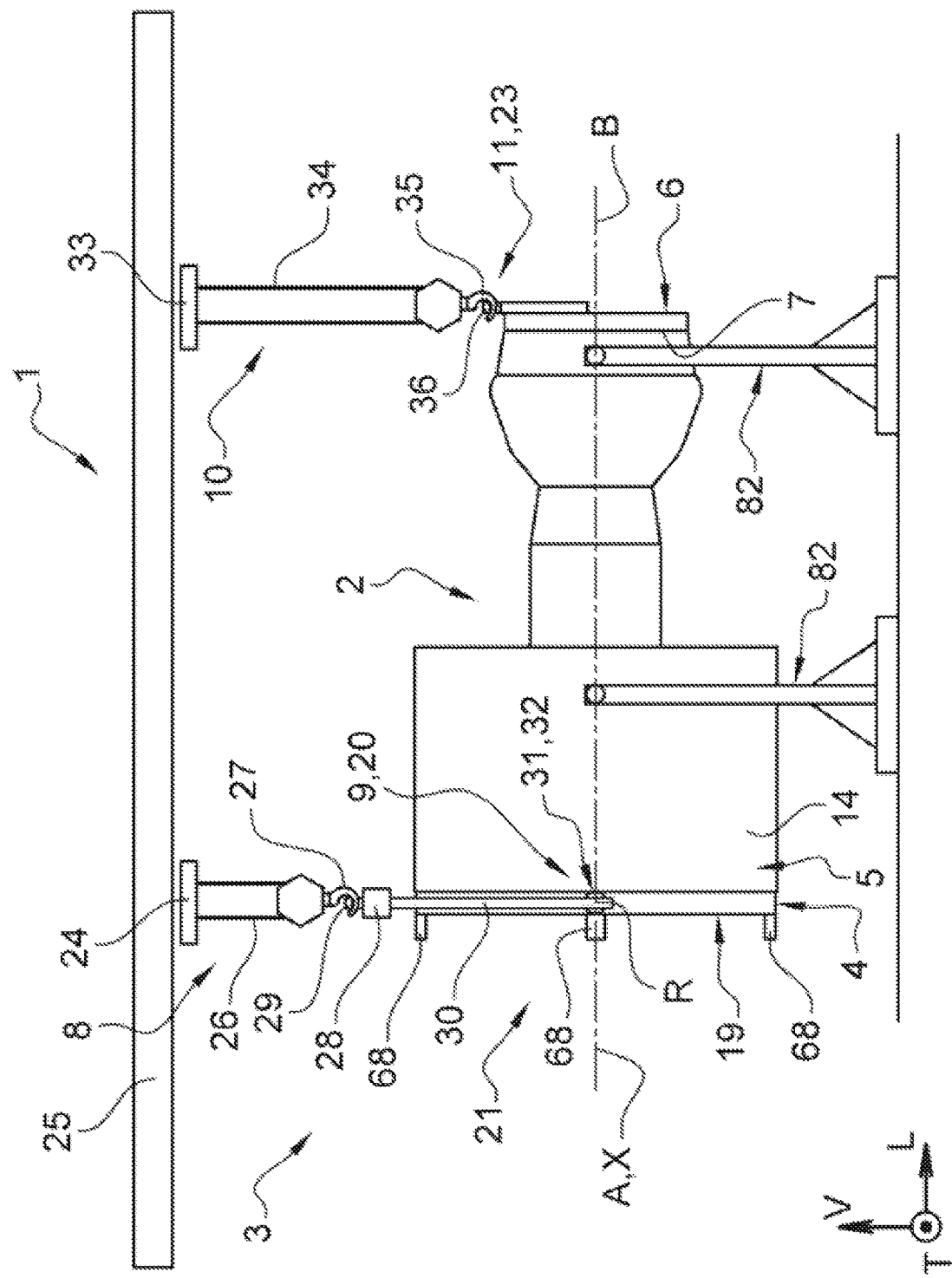
FIG. 10 is a schematic side view illustrating a first step in a method of placing a propulsive assembly from a horizontal position to a vertical position by means of the installation.
Figure 12:
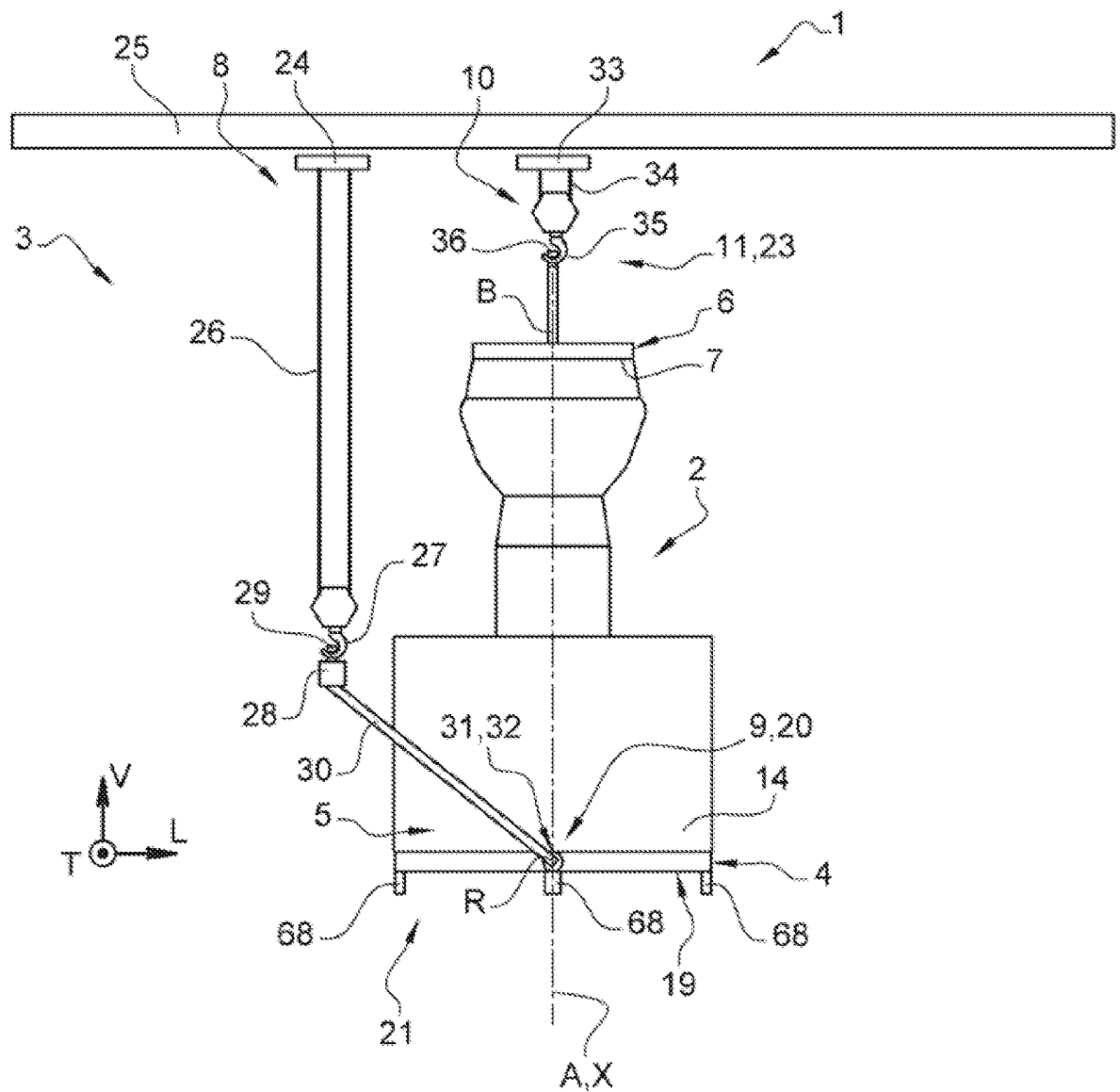
FIG. 12 is a schematic side view illustrating a third step of the method of placing a propulsive assembly from a horizontal position to a vertical position by means of the installation.

FIG. 1 shows an installation 1 for placing a propulsive assembly 2 of axis X (or first axis X) from a horizontal position (horizontal axis X) (FIG. 10) to a vertical position (vertical axis X) (FIG. 12).

An orthogonal reference mark L, T, V is defined with respect to the installation 1, comprising three axes perpendicular to each other, namely:
- an axis L, defining a longitudinal, horizontal direction, parallel with the axis X of the propulsive assembly 2 when it is in a horizontal position,
- an axis T, defining a transverse, horizontal direction, which with the axis X defines a horizontal plane XY parallel to the ground on which the installation 1 rests,
- an axis V, defining a vertical direction, perpendicular to the horizontal plane XY.

The installation 1 comprises a tooling 3 comprising a front tool 4 configured to be mounted on a fan module 5 of the propulsive assembly 2 and a rear tool 6 configured to be mounted on a rear casing 7 of the propulsive assembly 2.

The installation 1 also comprises a first lifting system 8 comprising first means 9 for attaching to the front tool 4. The first lifting system 8 is configured to move the first attaching means 9 horizontally along the longitudinal axis L and move the first attaching means 9 vertically.

The installation 1 further comprises a second lifting system 10 comprising second means 11 for attaching to the rear tool 6. The second lifting system 10 is configured to horizontally move the second attaching means 11 along the longitudinal axis L and vertically move the second attaching means 11.

The propulsive assembly 2 comprises at least one fan module 5 at a front end of the propulsive assembly 2 and a rear casing 7 at a rear end opposite the front end. The fan module 5 comprises a rotor 12 (or shaft) carrying blades 13 and a front casing 14 (more commonly referred to as a fan casing) surrounding the blades 13.

According to the embodiment illustrated in the figures, the propulsive assembly 2 comprises a dual flow turbomachine comprising, from front to back, and in the direction of the air flow through the turbomachine, a fan module 5 and a gas generator traditionally comprising one or more compressor stages, low pressure and high pressure, a combustion chamber, one or more turbine stages, high pressure then low pressure.

The fan module 5 comprises a plurality of vanes each comprising an aerodynamic profile blade 13 radially delimited by a free external end facing the front casing 14 and a root fixed to a disc connected in rotation to the rotor 12. The rotor 12 is guided in rotation via two rolling bearings 15 spaced axially from each other. The front casing 14 is flanged to an outer shell of an intermediate casing.

According to the embodiment shown in the figures, the rear casing 7 is the outer casing of the low pressure turbine. Alternatively, the rear casing 7 could be a turbine center frame (TCF) if the low pressure turbine has been removed when the propulsive assembly 2 is in the horizontal position. The turbine center frame is located at the connection between the high pressure turbine and the low pressure turbine.

The front tool 4 of axis A (or second axis A) comprises a first assembly 16, a second assembly 17 and a member 18 for connection between the first assembly 16 and the second assembly 17. When the front tool 4 is mounted on the propulsive assembly 2, the axis A of the front tool 4 is coaxial with the axis X of the propulsive assembly 2.

The first assembly 16 of the front tool 4 comprises a frame 19 configured to be positioned and held with respect to the front casing 14 of the fan module 5. The frame 19 also comprises a first connection interface 20 configured to be connected with the first attaching means 9 of the first lifting system 8 such that the frame 19 is rotatable about an axis of rotation R with respect to the first attaching means 9.

The second assembly 17 comprises a shaft 22 configured to be positioned and held relative to the rotor 12 of the fan module 5.

The connection member 18 is configured to be positioned and held with respect to the first assembly 16 on the one hand, and positioned and held with respect to the second assembly 17 on the other hand.

The rear tool 6 of axis B (or third axis B) is configured to be positioned and held with respect to the rear casing 7, the rear tool 6 comprising a second connection interface 23 configured to be connected with the second attaching means 11 of the second lifting system 10. When the rear tool 6 is mounted on the propulsive assembly 2, the axis B of the rear tool 6 is coaxial with the axis X of the propulsive assembly 2.

By convention in the present application, "axial" or "axially" means any direction parallel to the axis X (respectively to the axes A and B), and "radial" or "radially" means any direction perpendicular to the axis X (respectively to the axes A and B). Similarly, by convention in the present application, the terms "internal", "external", "inside" or "exterior" are defined radially with respect to the axis X (respectively the axes A and B). Finally, the terms "front" and "rear" are defined axially with respect to the axis X when the propulsive assembly 2 is in a horizontal position (FIG. 10), with the fan module 5 at a front end of the propulsive assembly 2 and the rear casing 7 at a rear end opposite the front end.

According to the embodiment illustrated in the figures and in particular in FIGS. 1 and 10 to 12, the first lifting system 8 comprises a first lifting device 24 such as a winch, a load balancer or a hoist. The first lifting device 24 is movable in longitudinal translation (along the axis L) on a beam 25 supported by a supporting structure. The first lifting device 24 further comprises a windable (respectively unwindable) cable 26 with a first lifting hook 27. The first lifting system 8 further comprises a single-beam spreader 28 arranged transversely (along the axis T) comprising a central first lifting ring 29 in which the first lifting hook 27 is engaged. The first lifting system 8 also comprises two slings 30, each sling 30 (single strand) being connected at one end to the spreader 28 and having a bracket 31 at an opposite end, the bracket 31 comprising an orifice in which a trunnion 32 of the first connection interface 20 is housed when the frame 19 is connected to the first lifting system 8. The two brackets 31 define the first attaching means 9. The two trunnions 32 define the first connection interface 20.

Advantageously, the distance between the trunnions 32 is substantially equal to the distance between the two slings 30 at the level of the spreader 28.

In the same way as the first lifting system 8, the second lifting system 10 comprises a second lifting device 33 such as a winch, a load balancer, a hoist. The second lifting device 33 is movable in longitudinal translation (along the axis L) on the beam 25. The second lifting device 33 comprises a windable (respectively unwindable) cable 34 provided with a second lifting hook 35. The second lifting hook 35 is engaged in a second lifting ring 36 of the rear tool 6 when the rear tool 6 is connected to the second lifting system 10. The second lifting hook 35 defines the second attaching means 11. The second lifting ring 36 defines the second connection interface 23.

Alternatively, in the same way as the first lifting system 8, the second attaching means 11 could be two sling brackets connected to a spreader bar itself connected with the second lifting device, the second connection interface 23 would then be defined by two trunnions of the rear tool.

According to the embodiment illustrated in the figures, when the front tool 4 is mounted on the propulsive assembly 2, the shaft 22 is housed in part in an internal housing 37 of the rotor 12.

The shaft 22 comprises a first front centering surface 38 (centred on the axis A) configured to be inserted in a first front bore 39 of the housing 37 of the rotor 12. The shaft 22 also comprises a second rear centering surface 40 (centered on the axis A) configured to be inserted in a second rear bore 41 of the housing 37. The shaft 22 further comprises a first front bearing surface 42 (perpendicular to the axis A) configured to come into axial bearing with a first rear face 43 of an abutment 44 of the housing 37. The second assembly 17 comprises a ring 45 added on to the shaft 22, the ring 45 having a second rear bearing surface 46 (perpendicular to the axis A) configured to come into axial bearing with a second front face 47 of the rotor 12. The second assembly 17 further comprises a first nut 48 added on to the shaft 22, the first nut 48 comprising a tapped portion cooperating with a first threaded portion 49 of the shaft 22 so that tightening of the first nut 48 holds contact not only between the first bearing surface 42 and the first face 43 but also between the second bearing surface 46 and the second face 47.

Figure 8:
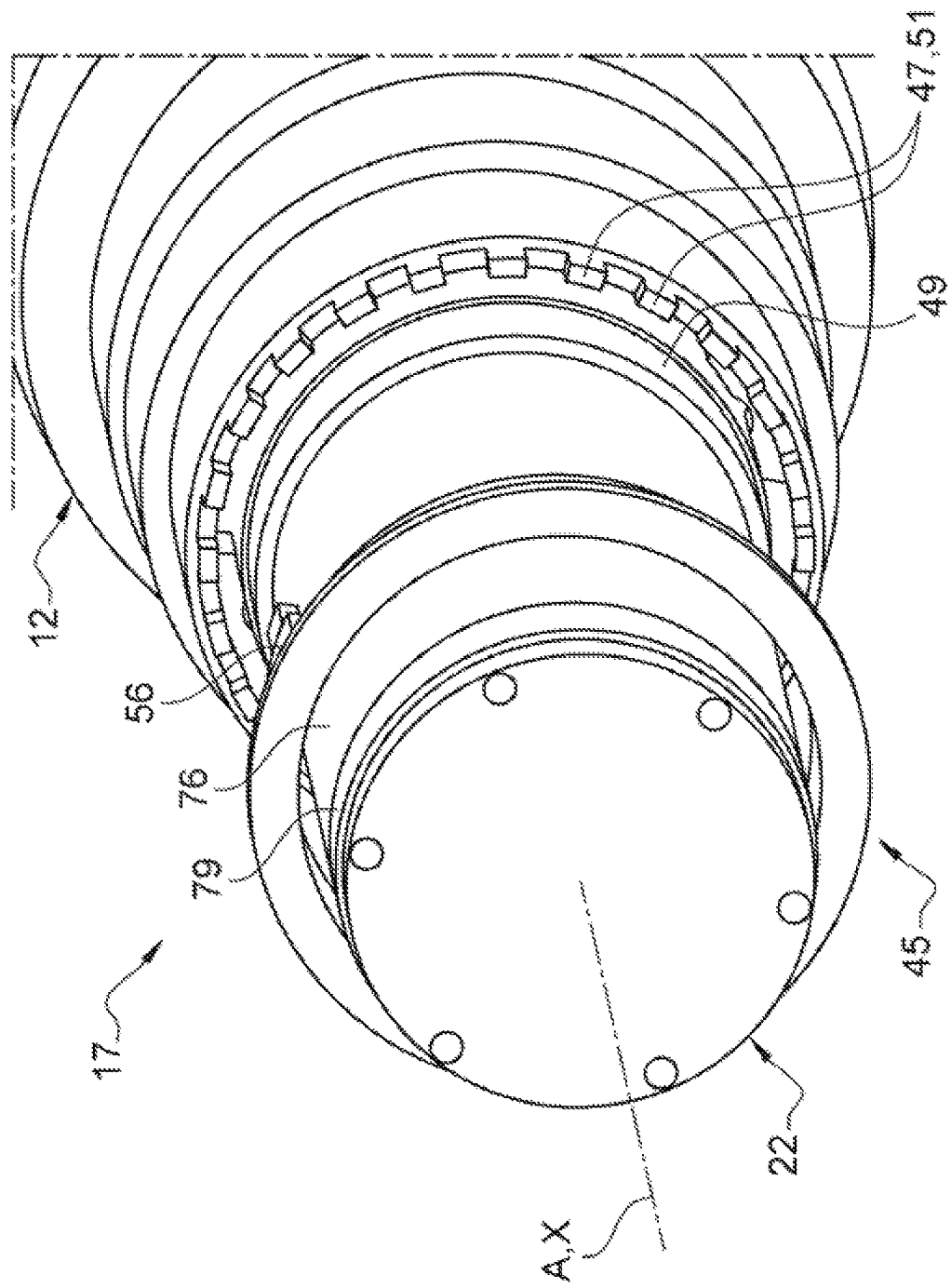
FIG. 8 is a perspective view illustrating the mounting of the second front tool assembly to the propulsive assembly.
Figure 9:
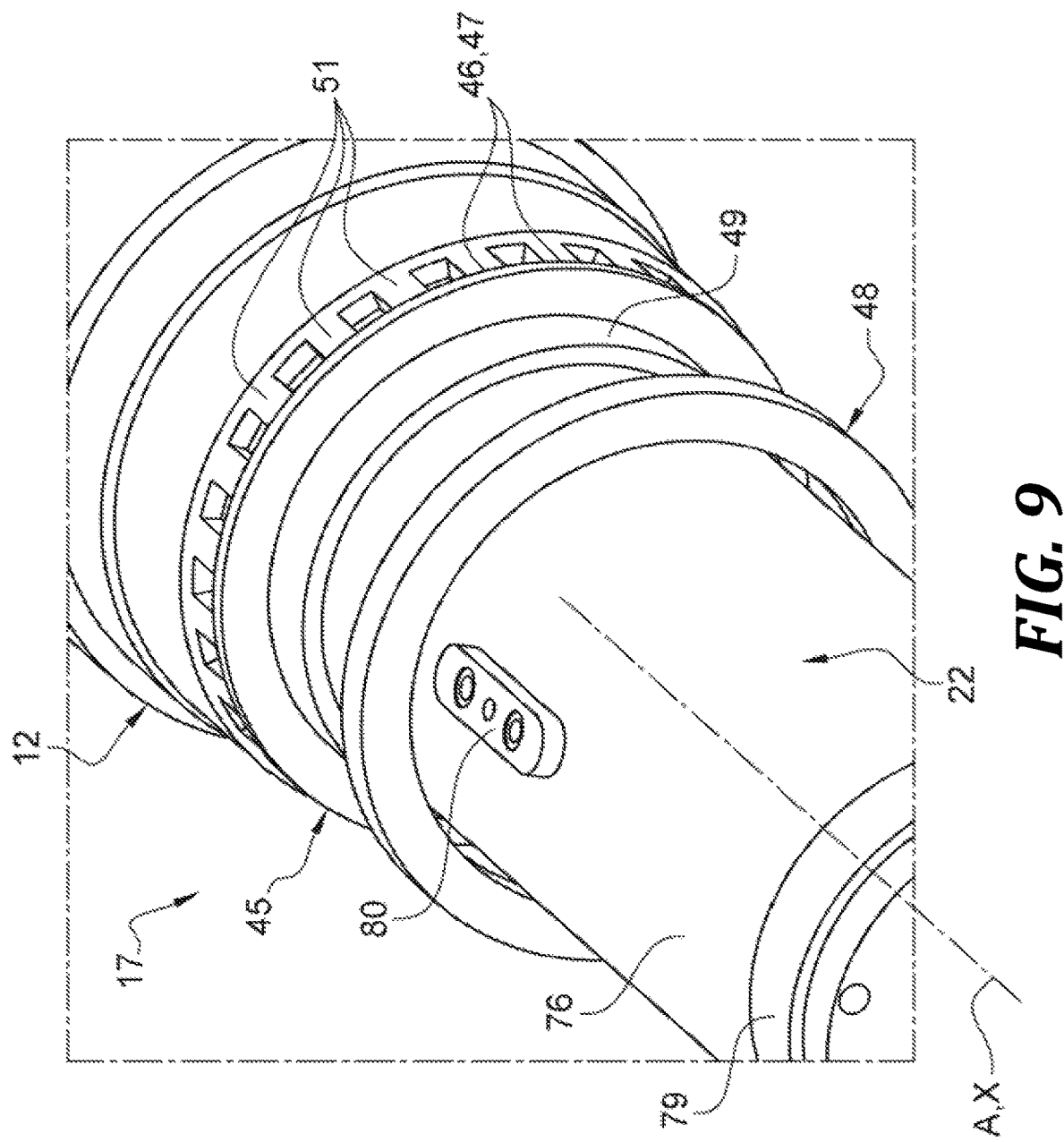
FIG. 9 is a perspective view illustrating the mounting of the second front tool assembly to the propulsive assembly.

More specifically, the shaft 22 is tubular. The shaft 22 has, from front to rear, the first threaded portion 49, the first centering surface 38, the first bearing surface 42 and the second centering surface 40. The second centering surface 40 is defined by the outer surface of a protective clamp 50 added on to the shaft 22. The first and second centering surfaces 38, 40 are cylindrical. The second face 47 is defined by axial teeth 51 of a clutch sleeve of the rotor 12 (FIGS. 7 to 9).

Figure 7:
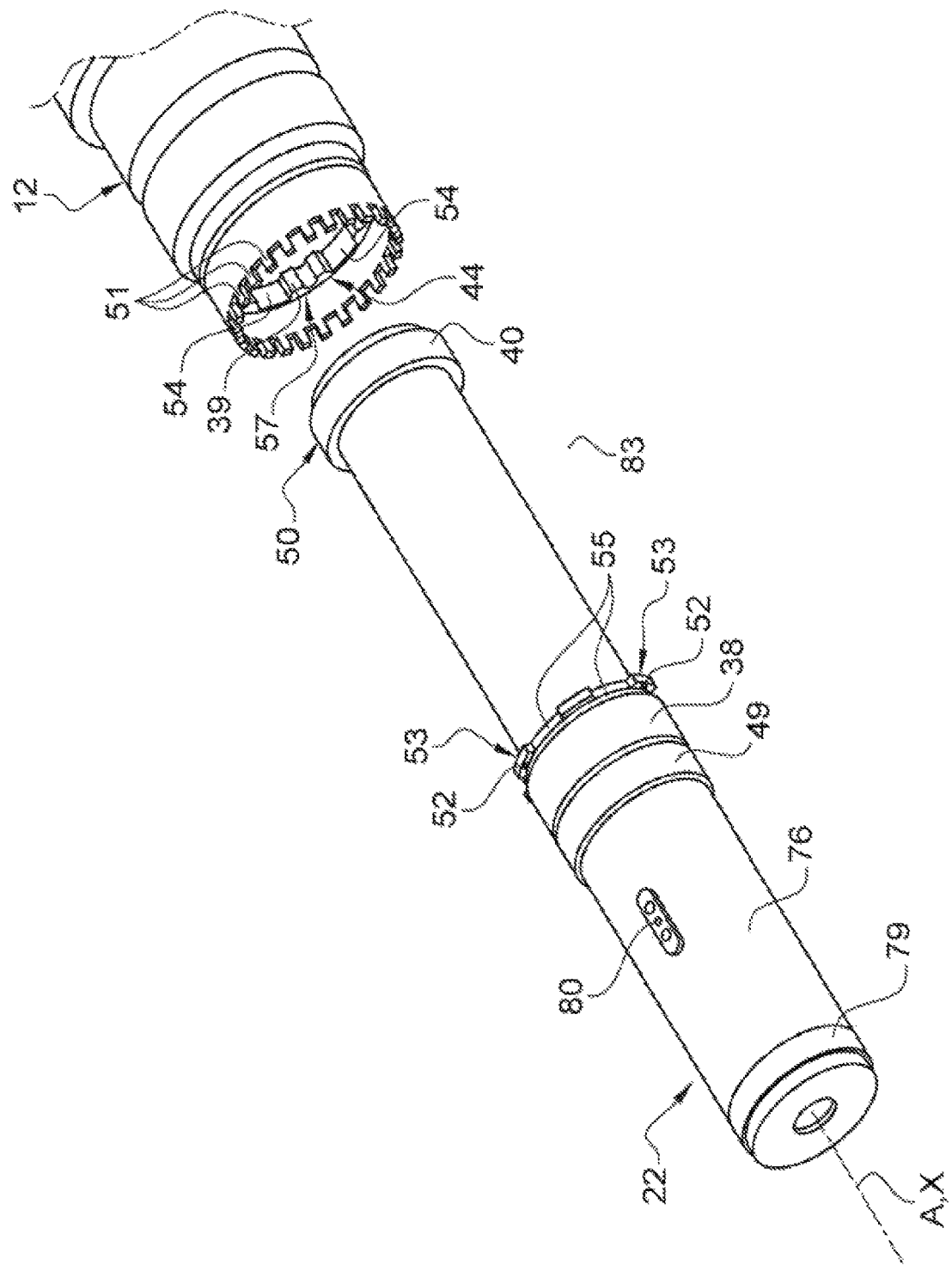
FIG. 7 is a perspective view illustrating the mounting of a second front tool assembly to the propulsive assembly.

As illustrated in the figures and in particular FIG. 7, the first bearing surface 42 is defined by six coplanar front facets 52 having equal dimensional characteristics. The facets 52 are perpendicular to the axis A and spaced circumferentially about the axis A in a regular manner. Each of the facets 52 is formed on a tooth 53 projecting radially from the shaft 22. The teeth 53 are adapted to pass axially through the abutment 44 of the housing 37 via complementarily shaped apertures 54 made in the abutment 44. In cross-section, each aperture 54 has an exterior profile equivalent to that of a tooth 53.

More specifically, the teeth 53 have parallel flanks. Each tooth 53 extends axially along the axis A from the facet 52.

The circumferential space between two adjacent facets 52 defines an axial passage 55. The ring 45 of the second assembly 17 includes an axially projecting lug 56 configured to simultaneously pass through one of the apertures 54 and passage 55 so as to rotatably connect the shaft 22 with the rotor 12 and ensure contact between the first bearing surface 42 and the first face 43.

Figure 5:
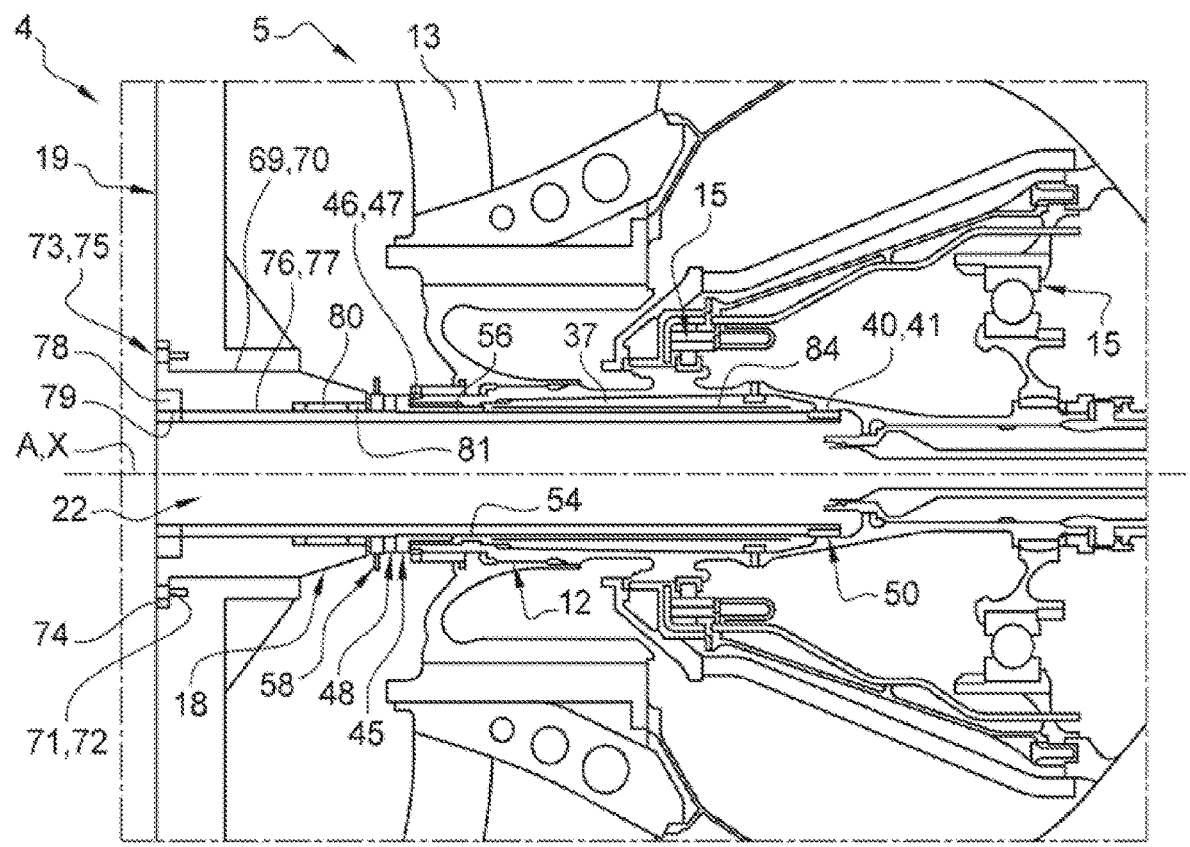
FIG. 5 is a detail axial sectional view along a plane P' illustrating the mounting of the front tool on a rotor of the fan module, the plane P' passing through both the axis X and a tooth of a shaft of the front tool as shown in FIG. 1.
Figure 5:
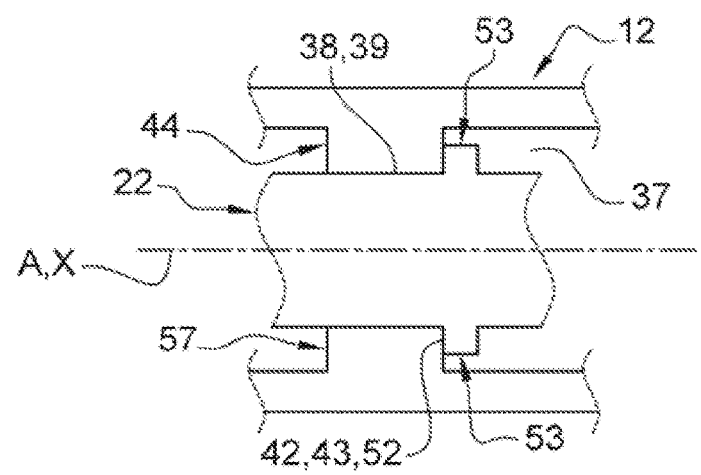

As shown in FIG. 5, the first front bore 39 is formed in the abutment 44. That is, the first bore 39 is defined by the six inner walls of the protrusions 57 of the abutment 44, each protrusion 57 being located between two adjacent apertures 54 of the abutment 44.

As illustrated in the figures, the second assembly 17 further comprises a locknut 58 located axially between the first nut 48 and the connection member 18, the locknut 58 comprising a tapped portion co-operating with the first threaded portion 49 of the shaft 22.

Advantageously, the first connection interface 20 of the frame 19 is located at a periphery of the frame 19 such that the first connection interface 20 is located outside the front casing 14.

Advantageously, the first assembly 16 comprises ground bearing means 21.

Figure 3:
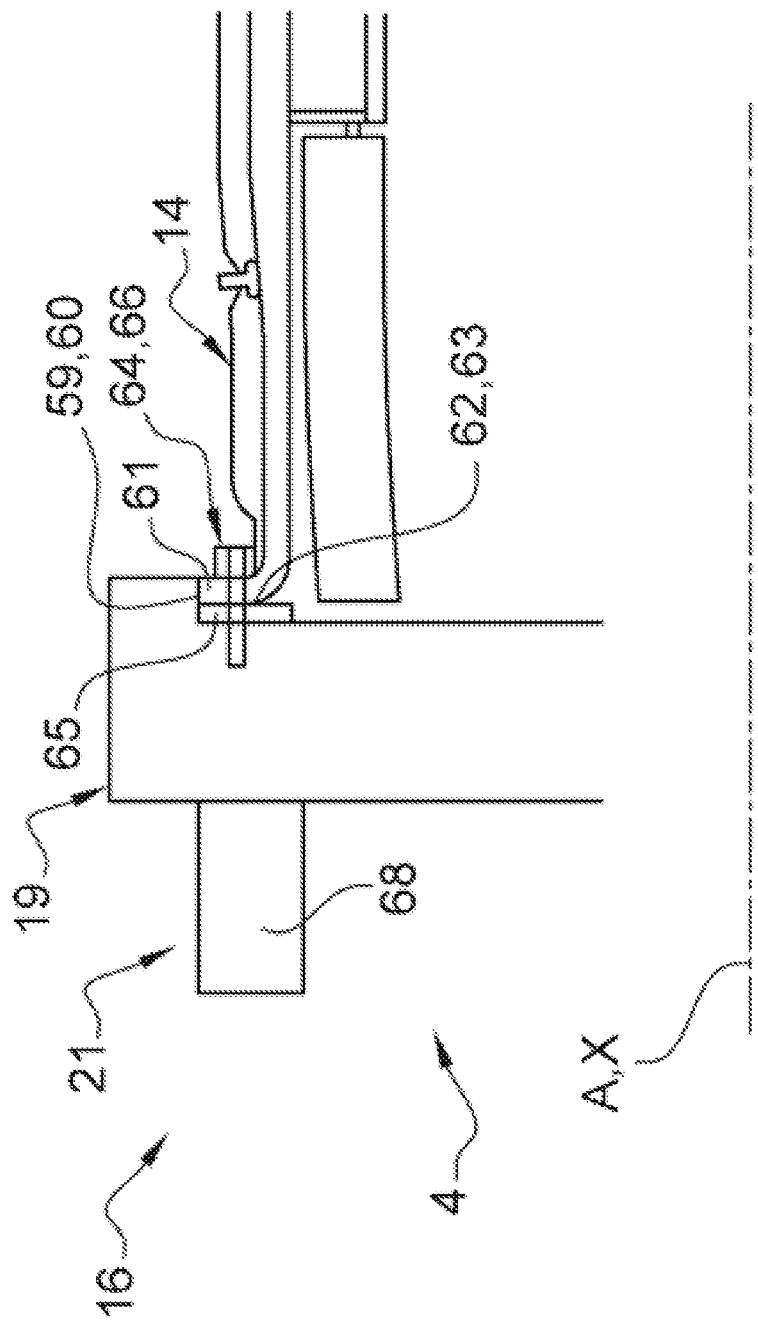
FIG. 3 is a detail axial sectional view illustrating the mounting of the front tool on a front casing of a fan module of a propulsive assembly with an axis X.

According to the embodiment illustrated in the figures and in particular FIG. 3, the frame 19 comprises a third blind bore 59 (centred on the axis A) configured to receive a third centering surface 60 of a collar 61 of the front casing 14. The frame 19 further comprises a third rear bearing surface 62 (perpendicular to the axis A) configured to come into axial bearing with a third front face 63 of the collar 61 of the front casing 14. The first assembly 16 comprises a plurality of first holding elements 64 distributed regularly around the axis A and configured to reversibly hold the collar 61 to the frame 19 when the third bore 59 receives the third centering surface 60 and the third bearing surface 62 bears against the third face 63.

More specifically, the frame 19 is generally circular in shape. The third bearing surface 62 is defined by the rear surface of a protective washer 65 added on to the frame 19. The first holding elements 64 are screws 66 distributed regularly around the axis A. The frame 19 includes holes 67 in order to minimise its mass. The ground bearing means 21 are opposite the third centering and bearing surfaces 60, 62. The ground bearing means 21 are defined by four feet 68 extending axially along the axis A and evenly distributed around the axis A.

The frame 19 comprises two diametrically opposed trunnions 32 aligned along the axis of rotation R. The two trunnions 32 define the first connection interface 20. Each trunnion 32 is configured to be inserted in a hole in a bracket 31 of a sling 30 of the first lifting system 8. The trunnions 32 are added on the periphery of the frame 19 so that the trunnions 32 are located outside the front casing 14 when the frame 19 is mounted on the propulsive assembly 2. Such a positioning of the trunnions 32 avoids any contact between the slings 30 and the propulsive assembly 2 when it is put in a vertical position.

Figure 4:
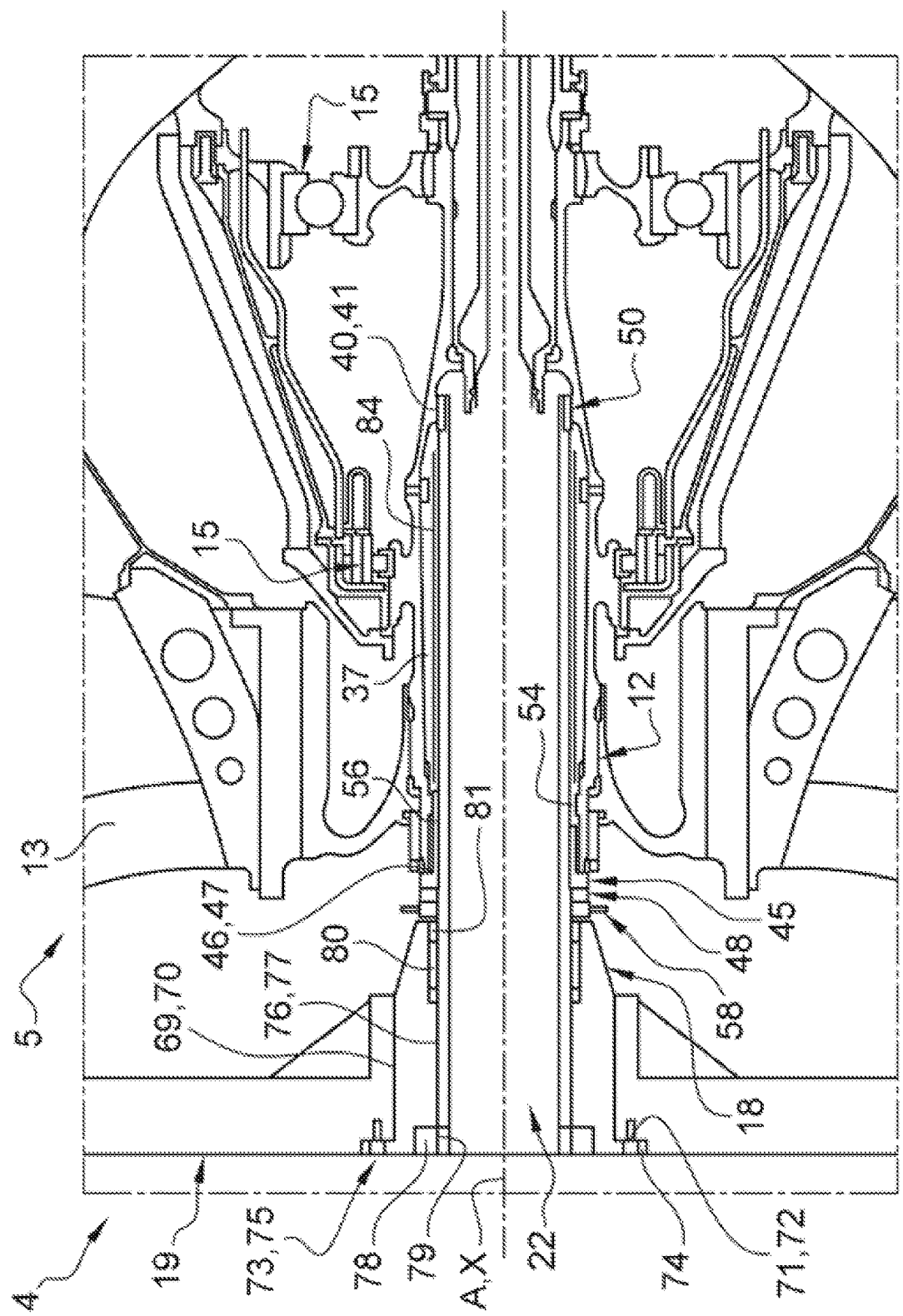
FIG. 4 is a detail axial sectional view in plane P illustrating the mounting of the front tool on a rotor of the fan module, the plane P passing through both the axis X and a lug of a ring of the front tool as shown in FIG. 1.

According to the embodiment illustrated in the figures and in particular in FIG. 4, the connection member 18 comprises a fourth centring surface 69 (centred on the axis A) inserted in a fourth bore 70 of the frame 19 (mounted position). The connection member 18 also comprises a fourth rear bearing surface 71 (perpendicular to the axis A) axially bearing against a fourth front face 72 of the frame 19 (mounted position). The connection member 18 further comprises a plurality of second holding elements 73 evenly distributed around the axis A and configured to reversibly hold the connection member 18 to the frame 19 when the fourth centering surface 69 is inserted in the fourth bore 70 and the fourth bearing surface 71 bears against the fourth face 72.

More precisely, the connection member 18 is a part of revolution about the axis A. The fourth centering surface 69 is cylindrical. The fourth bearing surface 71 is defined by the rear surface of a front collet 74 of the connection member 18 (mounted position). The fourth face 72 is defined by a shoulder of a cylindrical recess (centred on the axis A) formed from the front of the frame 19. The second holding elements 73 are screws 75 evenly distributed around the axis A.

Figure 6:
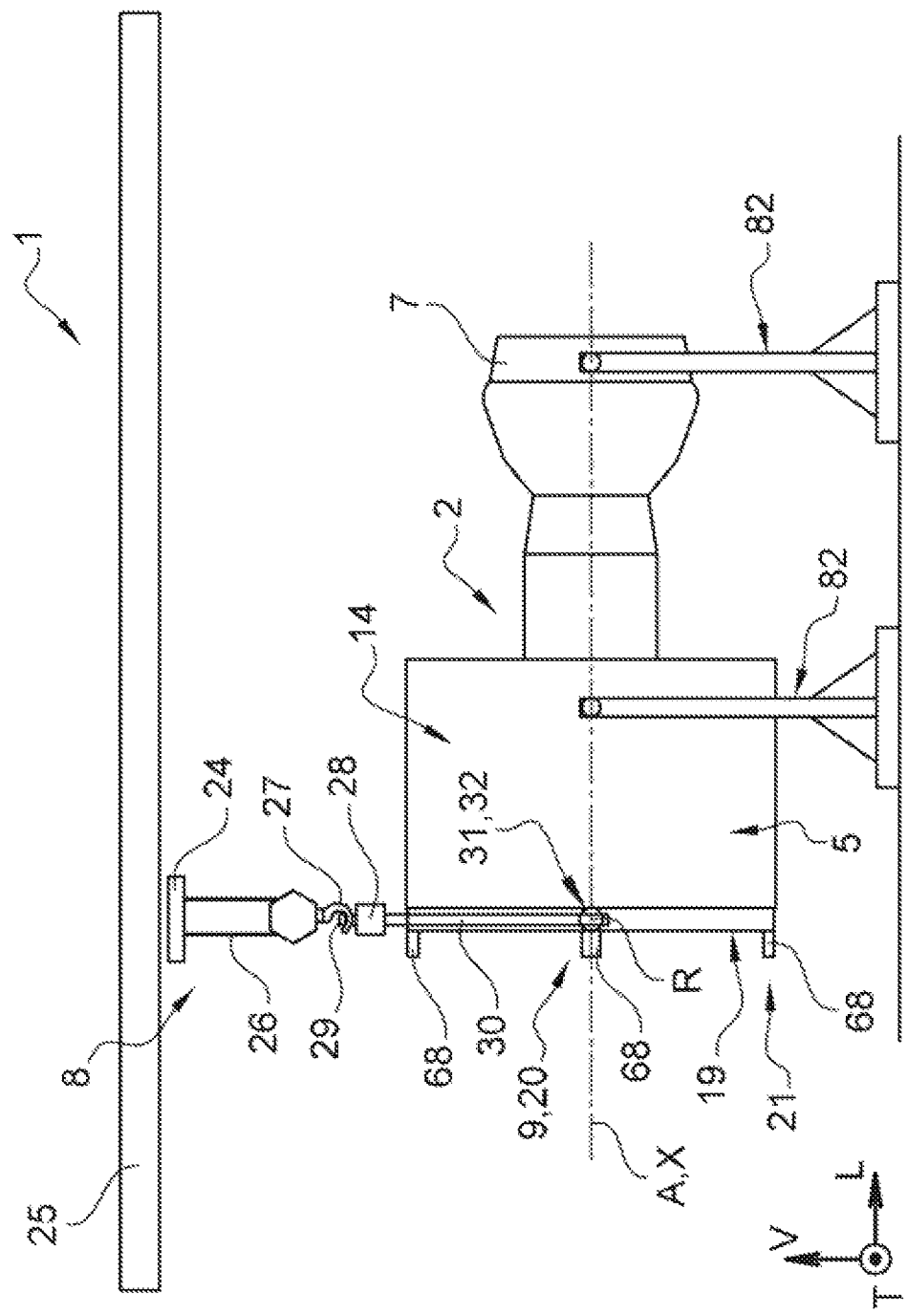
FIG. 6 is a schematic side view illustrating the mounting of a first front tool assembly to the propulsive assembly.

According to the embodiment illustrated in the figures and in particular in FIGS. 4 and 6, the shaft 22 comprises a fifth centering surface 76 placed in front of the first nut 48, the fifth centering surface 76 (centered on the axis A) being inserted in a fifth bore 77 of the connection member 18. The second assembly 17 comprises a second nut 78 added on to the shaft 22. The second nut 78 comprises a tapped portion cooperating with a second threaded portion 79 of the shaft 22 so that tightening of the second nut 78 holds the second assembly 17 relative to the first assembly 16.

More specifically, the fifth centering surface 76 is cylindrical. The second nut 78 axially bears against a shoulder of a counterbore formed from the front of the connection member 18. The second threaded portion 79 is positioned in front of the fifth centering surface 76 which is itself positioned in front of the first threaded portion 49 of the shaft 22.

According to the embodiment illustrated in the figures, the front tool 4 comprises means for connecting in rotation the second assembly 17 with the connection member 18.

More precisely, the connection means are defined by a key 80 housed partly in the shaft 22 and partly in an axial groove 81 of the connection member 18, the groove 81 opening out at least at the rear of the connection member 18.

The mounting of a tool 3 of an installation 1 on a propulsive assembly 2 of axis X comprising at least one fan module 5 at a front end of the propulsive assembly 2 and a rear casing 7 at a rear end opposite the front end, the fan module 5 comprising a rotor 12 carrying blades 13 and a front casing 14 surrounding the blades 13, is carried out in accordance with a mounting method comprising at least the following steps:

- a step of mounting the front tool 4 on the fan module 5 so that the axis of rotation R is substantially horizontal;
- a step of mounting the rear tool 6 on the rear casing 7.

The front tool 4 can be mounted before the rear tool 6, or vice versa. When mounting the front and rear tools the propulsive assembly 2 is arranged in a storage device 82 (or storage cradle) in a horizontal position (FIG. 6).

The step of mounting the front tool 4 comprises the following sub-steps:

- a first sub-step of connecting the first attaching means 9 of the first lifting system 8 to the first connection interface 20 of the frame 19;
- a second sub-step of positioning and holding the frame 19 in position with respect to the front casing 14 of the fan module 5;
- a third sub-step of positioning and holding the shaft 22 in position with respect to the rotor 12 of the fan module 5;
- a fourth sub-step of positioning the connection member 18 with respect to the first and second assemblies 16, 17;
- a fifth sub-step of holding the connection member 18 in position with respect to the first assembly 16; and
- a sixth sub-step of holding the connection member 18 in position with respect to the second assembly 17.

According to the embodiment illustrated in the figures, in the first sub-step, the first assembly 16 is for example stored in a storage rack, an operator inserts each trunnion 32 of the frame 19 in the orifice of the corresponding bracket 31 of the first lifting system 8 so that the frame 19 is movable in rotation about the axis of rotation R with respect to the brackets 31.

In the second sub-step, as illustrated in FIG. 6, the frame 19 is moved from the storage rack to the fan module 5 of the propulsive assembly 2 by operating the first lifting device 24. The frame 19 is then positioned with respect to the front casing 14 by inserting the third centering surface 60 of the collar 61 into the third bore 59 of the frame 19 and bringing the rear surface of the protective washer 65 (third bearing surface 62) into contact with the third face 63 of the collar 61. The frame 19 is positioned angularly about the axis A so that the axis of rotation R is substantially horizontal. Finally, the frame 19 is held in position with respect to the front casing 14 by screwing in the screws 66 (first holding elements 64).

In the third sub-step, the shaft 22 is inserted axially in the housing 37 of the rotor 12 in the direction indicated by the arrow 83 in FIG. 6 while aligning the teeth 53 of the shaft 22 with the apertures 54 of the abutment 44 so that the teeth 53 can pass axially through the abutment 44. The shaft 22 is then positioned (vertically and transversely) with respect to the rotor 12 by inserting the outer surface of the protective clamp 50 (second centering surface 40) into the second bore 41 of the housing 37 and inserting the first centering surface 38 into the first bore 39 of the abutment 44, with the teeth 53 behind the abutment 44. The shaft 22 is then positioned (longitudinally) by manually rotating the shaft 22 about the axis A so as to overlap the teeth 53 of the shaft 22 with the protrusions 57 of the abutment 44 (FIG. 5), this angular positioning of the shaft 22 being arrested by simultaneously inserting the lug 56 of the ring 45 added on to the shaft 22 into an aperture 54 of the abutment 44 and a passage 55 of the shaft 22 defined between two adjacent teeth 53 (FIG. 8). The ring 45 is axially stopped by the axial bearing of its second bearing surface 46 against the teeth 51 of the clutch sleeve of the rotor 12 (second face 47) (FIG. 9). The lug 56 allows the shaft 22 to be connected in rotation with the rotor 12 and ensures the contact between the first bearing surface 42 of the shaft 22 and the first face 43 of the abutment 44. The shaft 22 is held in position by screwing the first nut 48 added onto the first threaded portion 49 of the shaft 22 (FIG. 9). After screwing, the first nut 48 is axially supported against the ring 45, the second bearing surface 46 of the ring 45 is axially supported against the teeth 51 of the clutch sleeve and the facets 52 of the teeth 53 of the shaft 22 (first bearing surface 42) are axially bearing against the first face 43 of the abutment 44. The locknut 58 is mounted on the first threaded portion 49 without being tightened. Prior to the insertion of the shaft 22 into the housing 37, a protective sleeve 84 may be placed in the housing 37, the protective sleeve 84 advantageously extending from the abutment 44 of the housing 37 to the second bore 41.

In the fourth sub-step, the connection member 18 is positioned (transversely and vertically) with respect to the first and second assemblies 16, 17 via the insertion of the fifth centering surface 76 of the shaft 22 into the fifth bore 77 of the connection member 18 and the insertion of the fourth centering surface 69 of the connection member 18 into the fourth bore 70 of the frame 19. The connection member 18 is then positioned (longitudinally) by inserting the previously positioned key 80 into its groove 81 and bringing its fourth bearing surface 71 into contact with the shoulder of the recess in the frame 19 (fourth face 72).

In the fifth sub-step, the connection member 18 is held in position with respect to the frame 19 by screwing in the screws 75 (second holding elements 73).

In the sixth sub-step, the connection member 18 is held in position with respect to the shaft 22 by screwing the second nut 78 onto the second threaded portion 79 of the shaft 22. After screwing, the second nut 78 is axially supported against the shoulder of the counterbore of the connection member 18 and the roller bearings 15 of the rotor 12 are preloaded so that the rotor 12 is completely immobilised when the propulsive assembly 2 is put in the vertical position. The locknut 58 of the second assembly 17 is then tightened onto the first threaded portion 49 in order to lock the front tool 4, the locknut 58 bearing axially against the first nut 48 after tightening.

Advantageously, the second nut 78 is tightened according to a predetermined tightening parameter, such as torque, so as to apply the desired preload (e.g. a force of 50 Newtons) to the rolling bearings 15 of the rotor 12.

The step of mounting the rear tool 6 comprises the following sub-steps:
- a sub-step of connecting the second attaching means 11 of the second lifting system 10 to the second connection interface 23 of the rear tool 6;
- a sub-step of positioning and holding the rear tool 6 in position with respect to the rear casing 7.

According to the embodiment illustrated in the figures, in the first sub-step, the rear tool 6 is for example stored in a storage rack, an operator inserts the second lifting hook 35 of the second lifting system 10 in the second lifting ring 36 of the rear tool 6.

In the second sub-step, the rear tool 6 is moved from the storage rack to the rear casing 7 of the propulsive assembly 2 by operating the second lifting device 33. The frame 19 is then positioned and held in position with respect to the rear casing 7.

The placing of the propulsive assembly 2 from a horizontal position to a vertical position by means of the installation 1, the tooling 3 of the installation 1 being mounted on the propulsive assembly 2, the propulsive assembly 2 being disposed in a storage device 82 in a horizontal position, the first and second attaching means 9, 11 being respectively connected to the first and second connection interfaces, the placing method comprising the following steps:
- a step of removing the propulsive assembly 2 so that the propulsive assembly 2 is only supported by the front and rear tools;
- a step of maneuvering the first and second lifting systems 8, 10 so as to tilt the propulsive assembly 2 about the axis of rotation R so as to lower the front tool 4 and raise the rear tool 6 (FIG. 11);
- a step of placing the propulsive assembly 2 in a vertical position on the ground bearing means 21 of the front tool 4 so that the axis X of the propulsive assembly 2 is vertical (FIG. 12).

According to the embodiment illustrated in the figures, during the removing step, the propulsive assembly 2 is lifted via the first and second lifting devices 24, 33 controlled in a synchronised manner, the propulsive assembly 2 then being supported only by the front and rear tools.

Figure 11:
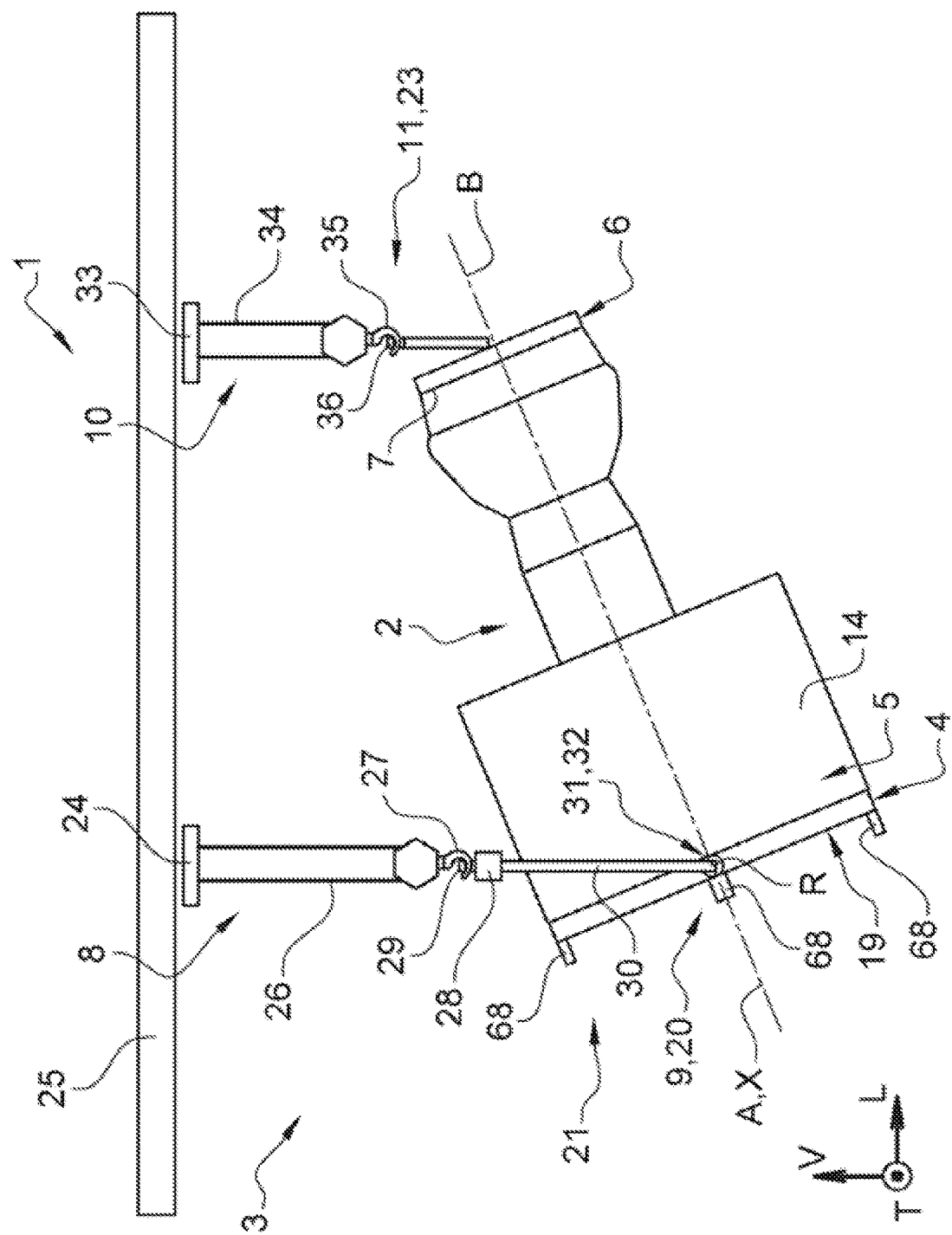
FIG. 11 is a schematic side view illustrating a second step of the method of placing a propulsive assembly from a horizontal position to a vertical position by means of the installation.

During the maneuvering step, the slings 30 and the cables 26, 34 of the first and second lifting devices 24, 33 must be permanently tensioned so that the forces are evenly taken up by the propulsive assembly 2 at the front and rear tools. In general, the front tool 4 is lowered, the rear tool 6 is raised and moved longitudinally towards the front tool 4. As shown in FIG. 11, the propulsive assembly 2 swings from a horizontal to a vertical position in a counter-clockwise direction.

In the placing step, the propulsive assembly 2 is laid flat in a vertical position on the roots 68 of the front tool 4.

The invention claimed is:

1. Tooling for placing a propulsive assembly from a horizontal position to a vertical position, said propulsive assembly being defined by a first axis (X) and comprising at least one fan module at a front end of said propulsive assembly and a rear casing at a rear end opposite said front end, said fan module comprising a rotor carrying blades and a front casing surrounding said blades, said tooling comprising:
   a front tool defined by a second axis (A), the front tool comprising:
      a first assembly comprising a frame configured to be coupled to said front casing of said fan module and fixed in rotation about the second axis (A) relative to said fan module, said frame comprising a first connection interface configured to be connected to first attaching means of a first lifting system so that said frame is movable about an axis of rotation (R) with respect to said first attaching means;
      a second assembly comprising a shaft configured to be fixedly positioned in rotation relative to said rotor of said fan module; and
      a connection member configured to be fixedly coupled in rotation to both said first assembly and said second assembly so that said rotor of said fan module is fixed in rotation relative to said frame; and
   a rear tool defined by a third axis (B), wherein the rear tool is configured to be positioned and held with respect to said rear casing, said rear tool comprising a second connection interface configured to be connected to second attaching means of a second lifting system.

2. The tooling according to claim 1, wherein the first assembly comprises two trunnions opposite and aligned according to said axis of rotation (R), said two trunnions defining said first connection interface, each trunnion being configured to be connected to said first attaching means of said first lifting system.

3. The tooling according to claim 1, wherein said shaft is configured to be housed at least in part in an internal housing of said rotor, said second assembly comprising:
   a first front centering surface of said shaft configured to be inserted in a first front bore of said housing;
   a second rear centering surface of said shaft configured to be inserted in a second rear bore of said housing;

a first front bearing surface of said shaft configured to come into axial bearing with a first rear face of an abutment of said housing;

a second rear bearing surface of a ring added on to said shaft, said second bearing surface being configured to come into axial bearing with a second front face of said rotor; and a first nut added on to said shaft, said first nut comprising a tapped portion cooperating with a first threaded portion of said shaft so that tightening of said first nut holds contact between said first bearing surface and said first face and between said second bearing surface and said second face.

4. The tooling according to claim 3, wherein the first bearing surface is defined by at least two coplanar facets, said facets being perpendicular to the second axis (A) and circumferentially spaced, each of said facets being formed on one of a plurality of teeth projecting radially from said shaft, said teeth being configured to pass axially through said abutment via complementarily shaped apertures made in said abutment.

5. The tooling according to claim 4, wherein a circumferential space between said at least two facets defines an axial passage, said ring comprising an axially projecting lug configured to pass simultaneously through one of the apertures and said passage to rotatably connect the shaft with said rotor and to ensure the contact between said first bearing surface and said first face.

6. The tooling according to claim 3, wherein said first front centering surface is configured to be inserted in said first front bore made in said abutment.

7. The tooling according to claim 3, wherein said second assembly comprises a fifth centering surface of said shaft placed in front of said first nut, said fifth centering surface being inserted in a fifth bore of said connection member, said second assembly comprising a second nut added on to said shaft, said second nut comprising a tapped portion cooperating with a second threaded portion of said shaft so that tightening of said second nut holds said second assembly relative to said first assembly.

8. The tooling according to one of claim 3, wherein the second assembly comprises a locknut placed between said first nut and said connection member, said locknut comprising a tapped portion cooperating with said first threaded portion of said shaft.

9. The tooling according to claim 1, wherein the first assembly comprises:
a third blind bore of said frame configured to receive a third centering surface of a collar of said front casing;
a third rear bearing surface of said frame configured to come into axial bearing with a third front face of said collar of said front casing; and
at least one first holding element configured to reversibly hold said collar to said frame when said third bore receives said third centering surface and said third bearing surface bears against said third face.

10. The tooling according to claim 1, wherein said connection member comprises:
a fourth centering surface inserted in a fourth bore of said frame;
a fourth rear bearing surface in axial bearing against a fourth front face of said frame; and
at least one second holding element configured to reversibly hold said connection member to said frame when said fourth centering surface is inserted in said fourth bore and said fourth bearing surface bears against said fourth face.

11. An installation for placing a propulsive assembly defined by a first axis (X) from a horizontal position to a vertical position, said installation comprising:
the tooling according to claim 1;
a first lifting system comprising first attachment means configured to attach to said first assembly, said first lifting system being configured to horizontally move said first attaching means along a longitudinal axis (L) and to vertically move said first attaching means, said longitudinal axis (L) being parallel to the first axis (X) of the propulsive assembly when in a horizontal position; and
a second lifting system comprising second attachment means to said rear tool, said second lifting system being configured to horizontally move said second attaching means along said longitudinal axis (L) and vertically move said second attaching means.

* * * * *